US012637879B2

(12) United States Patent
Lai

(10) Patent No.: US 12,637,879 B2
(45) Date of Patent: May 26, 2026

(54) KEY LOCK

(71) Applicant: The Sun Lock Company Limited, Tuen Mun (HK)

(72) Inventor: Karl Lai, Tai Po (HK)

(73) Assignee: The Sun Lock Company Limited, Tuen Mun (HK)

( * ) Notice: Subject to any disclaimer, the term of this patent is extended or adjusted under 35 U.S.C. 154(b) by 90 days.

(21) Appl. No.: 18/490,989

(22) Filed: Oct. 20, 2023

(65) Prior Publication Data

US 2024/0133210 A1 Apr. 25, 2024
US 2024/0229509 A9 Jul. 11, 2024

Related U.S. Application Data

(60) Provisional application No. 63/418,786, filed on Oct. 24, 2022.

(51) Int. Cl.
*E05B 67/24* (2006.01)
*E05B 29/00* (2006.01)
*E05B 67/06* (2006.01)

(52) U.S. Cl.
CPC .............. *E05B 67/24* (2013.01); *E05B 29/00* (2013.01); *E05B 29/0033* (2013.01); *E05B 67/06* (2013.01)

(58) Field of Classification Search
CPC ........ E05B 17/04; E05B 17/047; E05B 17/20; E05B 17/2084; E05B 17/2088; E05B 29/00; E05B 29/0033; E05B 67/06; E05B 67/22; E05B 67/24
See application file for complete search history.

(56) References Cited

U.S. PATENT DOCUMENTS 1,895,655 A 1/1933 Fraim
2,133,528 A 10/1938 Bell
2,370,991 A * 3/1945 Ohno ...................... E05B 67/24 70/52
2,433,114 A * 12/1947 Gray ....................... E05B 67/24 70/38 A
3,172,279 A * 3/1965 Patriquin ................ E05B 67/24 70/38 A (Continued)

FOREIGN PATENT DOCUMENTS

AU 750069 B 7/2002
CN 201343934 Y 11/2009

(Continued)

*Primary Examiner* — Christopher J Boswell
(74) *Attorney, Agent, or Firm* — Ware, Fressola, Maguire & Barber LLP

(57) ABSTRACT

A padlock including a shackle having a short leg and a long leg, a lock body having a first hole configured to receive the short leg of the shackle, and a second hole configured to receive the long leg of the shackle, where the long leg is configured to at least partially remain within the lock body, a latch movable between a first position engaged with the short leg of the shackle and a second position disengaged from the short leg of the shackle, a cylinder configured for rotational movement within the lock body and operatively engaged with the latch, a sleeve configured to control rotational movement of the cylinder, and wherein when the latch is in the first position the padlock is in a locked mode, and when the latch is in the second position the padlock is in an unlocked mode.

12 Claims, 7 Drawing Sheets

(56) References Cited

U.S. PATENT DOCUMENTS

| | | | | |
|---|---|---|---|---|
| 4,404,825 | A * | 9/1983 | Dixon | E05B 9/084 70/371 |
| 4,803,856 | A | 2/1989 | Ling | |
| 4,838,051 | A | 6/1989 | Yang | |
| 5,042,277 | A | 8/1991 | Jenn-Rong | |
| 5,609,048 | A | 3/1997 | Ling | |
| 5,765,409 | A | 6/1998 | Yang | |
| 5,782,113 | A | 7/1998 | Chen | |
| 5,901,587 | A | 5/1999 | Chen | |
| 6,082,155 | A | 7/2000 | Su | |
| 6,363,757 | B1 | 4/2002 | Yu | |
| 6,381,997 | B1 | 5/2002 | Chen | |
| 6,408,660 | B1 | 6/2002 | Lai | |
| 6,792,778 | B1 | 9/2004 | Chen | |
| 6,928,842 | B1 | 8/2005 | Huang | |
| 6,997,023 | B1 | 2/2006 | Huang | |
| 7,007,520 | B1 | 3/2006 | Lin | |
| 7,047,773 | B1 | 5/2006 | Lin | |
| 7,131,299 | B1 | 11/2006 | Huang | |
| 7,201,026 | B2 | 4/2007 | Yu | |
| 7,213,425 | B2 | 5/2007 | Ling et al. | |
| 7,216,517 | B2 | 5/2007 | Ling et al. | |
| 7,222,506 | B2 | 5/2007 | Yu | |
| 7,363,782 | B1 | 4/2008 | Misner et al. | |
| 7,523,628 | B2 | 4/2009 | Yu | |
| 7,698,913 | B2 | 4/2010 | Lee | |
| 7,779,657 | B2 | 8/2010 | Yu | |
| 8,011,212 | B2 | 9/2011 | Yu | |
| 8,171,760 | B2 | 5/2012 | Yen et al. | |
| 8,245,547 | B1 * | 8/2012 | Garthe | E05B 9/084 70/369 |
| 8,776,556 | B2 | 7/2014 | Lai | |
| 8,919,155 | B2 | 12/2014 | Lai | |
| 10,221,592 | B2 * | 3/2019 | Rodaer | E05B 67/24 |
| 11,214,988 | B2 * | 1/2022 | Fan | E05B 67/02 |
| 2005/0235706 | A1 | 10/2005 | Ling et al. | |
| 2005/0235707 | A1 | 10/2005 | Ling | |
| 2006/0130540 | A1 | 6/2006 | Lin | |
| 2006/0185404 | A1 | 8/2006 | Hansen | |
| 2006/0243005 | A1 | 11/2006 | Lai et al. | |
| 2007/0113607 | A1 * | 5/2007 | Huang | E05B 67/24 70/432 |
| 2008/0011026 | A1 | 1/2008 | Huang | |
| 2008/0047310 | A1 | 2/2008 | Yu | |
| 2008/0083251 | A1 | 4/2008 | Lai et al. | |
| 2008/0223088 | A1 | 9/2008 | Yang | |
| 2008/0250825 | A1 | 10/2008 | Lai | |
| 2008/0307839 | A1 | 12/2008 | Yu | |
| 2014/0047872 | A1 | 2/2014 | Yu | |
| 2024/0328205 | A1 * | 10/2024 | Lee, Jr. | E05B 67/24 |

FOREIGN PATENT DOCUMENTS

| | | | | |
|---|---|---|---|---|
| CN | 202731492 | U | | 2/2013 |
| CN | 203296496 | | | 11/2013 |
| CN | 203296496 | U | * | 11/2013 |
| CN | 103573040 | A | | 2/2014 |
| CN | 106050016 | A | | 10/2016 |
| GB | 2491621 | A | | 12/2012 |
| JP | S47028493 | | | 12/1972 |
| JP | S5744870 | U | | 3/1982 |
| JP | 2004285706 | A | | 10/2004 |
| JP | 3110279 | U | | 6/2005 |

* cited by examiner

KEY LOCK

CROSS-REFERENCE TO RELATED APPLICATIONS

This application claims priority to U.S. Provisional Appl. No. 63/418,786 filed Oct. 24, 2022, which is hereby incorporated by reference in its entirety.

BACKGROUND OF THE INVENTION

1. Field of the Invention

The present invention generally relates to keyed locks, and more particularly to a keyed padlock having a wafer lock system.

2. Related Art

There are a number of keyed locks constructed using pin tumbler systems.

SUMMARY OF THE INVENTION

An exemplary embodiment of the present invention is a key lock which is designed to incorporate a wafer lock system having a sleeve to hold and control cylinder rotation and placement of the cylinder.

An object of the present invention is to provide a padlock operable by a keyed cylinder.

It is another object of the present invention to provide a padlock having a keyed cylinder containing one or more wafers which control operation of the padlock.

It is yet another object of the present invention to provide a padlock having a sleeve configured to control rotation of the cylinder.

It is still another object of the present invention to provide a wafer slot within the sleeve to control the wafers so that when a correct cut key is inserted into the padlock, the wafers will be pushed downward to allow the cylinder to rotate within the sleeve.

It is yet another object of the present invention to provide control edges and a corresponding rotational-control finger so as to limit the angular movement of the cylinder within the sleeve so that the wafers will align with the wafer slot to let the wafers extend out of the cylinder.

It is still another object of the present invention to provide a wing extending from the sleeve for engagement with a sleeve-wing slot within the body of the padlock so that the sleeve will not rotate during the locked mode or the unlocked mode of the padlock.

It is a further object of the present invention to provide a cylinder-retain peg for interaction with a cylinder-retain slot on the sleeve to provide an additional or alternative mechanism for preventing rotation of the sleeve within the padlock.

It is still another object of the present invention for a retain slot of the cylinder to interact with the cylinder-retain peg so that the cylinder will have rotational movement but not vertical movement within the lock body.

It is another object the present invention to provide a bigger radius edge on one end of the cylinder so as to cover the wafers to disallow lock picking from outside, and to prevent the sleeve from sliding outside of the cylinder.

It is yet another object of the present invention that the bigger radius edge protects the sleeve by allowing for engagement of the sleeve with the cylinder-retain peg, the cylinder and the lock body, so that this arrangement prevents the sleeve from falling away from the lock body, and the bigger radius edge also protects the wafers from being bypass picked from outside of the lock, and so that the only way to open the lock is to provide the correct cut key to open the lock.

It is still another object of the present invention to provide an extended-pin from the cylinder which is operatively coupled to a control-slot in the latch to control the movement of the latch, so that the latch can move from the locked mode to the unlocked mode by rotational movement of the cylinder.

It will thus be seen that these and other objects can be obtained by a padlock according to an exemplary aspect of the present invention including a shackle having a short leg and a long leg, a lock body having a first hole configured to receive the short leg of the shackle, and a second hole configured to receive the long leg of the shackle, where the long leg is configured to at least partially remain within the lock body, a latch movable between a first position engaged with the short leg of the shackle and a second position disengaged from the short leg of the shackle, a cylinder configured for rotational movement within the lock body and operatively engaged with the latch, a sleeve configured to control rotational movement of the cylinder, and wherein when the latch is in the first position the padlock is in a locked mode, and when the latch is in the second position the padlock is in an unlocked mode.

According to this and other exemplary aspects of the present invention, the cylinder may include one or more wafers and one or more wafer springs, where each wafer spring engages with a corresponding wafer of the one or more wafers to urge the corresponding wafer in a direction to extend out of the cylinder, and where the sleeve may include a wafer slot configured to receive the one or more wafers when the one or more wafers are extended out of the cylinder, and the wafer slot is configured to inhibit rotation of the cylinder when the one or more wafers are extended out of the cylinder.

According to this and other exemplary aspects of the present invention, the cylinder may also include a rotational-control finger extending from the cylinder, and the sleeve may also include a control-edge lock side and a control-edge open side, the control-edge lock side is contacted by the rotational-control finger of the cylinder during the locked mode such that the one or more wafers will align with the wafer slot of the sleeve to allow the one or more wafers to extend out of the cylinder, and the control-edge open side is contacted by the rotational-control finger of the cylinder during the unlocked mode such that the cylinder will rotate between the control-edge lock side and the control-edge open side of the sleeve.

According to this and other exemplary aspects of the present invention, the cylinder is configured for receipt of a correct cut key, the correct cut key causes all of the one or more wafers to retract into the cylinder so that none of the one or more wafers are extended into the wafer-slot of the sleeve, and when all of the one or more wafers are retracted into the cylinder, the cylinder is configured to rotate within the sleeve.

According to this and other exemplary aspects of the present invention, the lock body may also include a cylinder-hole formed therein configured for receipt of the sleeve and the cylinder, the cylinder is at least partially surrounded by the sleeve, and the cylinder-hole may include a sleeve-wing slot configured for receipt of a wing of the sleeve, where engagement of the sleeve-wing slot with the wing of the sleeve prevents rotation of the sleeve within the lock body.

According to this and other exemplary aspects of the present invention, the sleeve may also include a retain-slot, the lock body may also include a cylinder-retaining hole formed therein, the cylinder-retaining hole is configured for receipt of a cylinder-retain peg, and the cylinder-retain peg is positioned within the retain-slot of the sleeve and prevents rotational movement of the sleeve within the lock body.

According to this and other exemplary aspects of the present invention, the cylinder may include a retain-slot, the lock body may include a cylinder-retaining hole formed therein, the cylinder-retaining hole is configured for receipt of a cylinder-retain peg, and the cylinder-retain peg is positioned within the retain-slot of the cylinder to allow the cylinder to have rotational movement within the lock body but prevent rectilinear movement of the cylinder within the lock body.

According to this and other exemplary aspects of the present invention, the cylinder may also include a bigger radius edge formed at one end of the cylinder, which bigger radius edge has a circumferential dimension larger than a circumferential dimension of the sleeve in order to retain the sleeve within the lock body.

According to this and other exemplary aspects of the present invention, the latch may include a control-slot, the cylinder may include an extended-pin configured for operative engagement with the control-slot of the latch, and by the rotational movement of the cylinder the extended-pin is configured to move the latch between the first position and the second position so as to operate the padlock between the locked mode and the unlocked mode.

According to this and other exemplary aspects of the present invention, the latch may include a control-slot, the cylinder may include an extended-pin configured for operative engagement with the control-slot of the latch, and by the rotational movement of the cylinder the control-pin is configured to move the latch from the first position to the second position so as to operate the padlock from the locked mode to the unlocked mode when all of the one or more wafers are retracted into the cylinder by the correct cut key.

According to this and other exemplary aspects of the present invention, the sleeve may include a retain-slot, the lock body may include a cylinder-retaining hole formed therein, the cylinder-retaining hole is configured for receipt of a cylinder-retain peg, and the cylinder-retain peg is positioned within the retain-slot of the sleeve and prevents rotational movement of the sleeve within the lock body.

According to this and other exemplary aspects of the present invention, the sleeve may include a retain-slot, and the cylinder-retain peg is positioned within the retain-slot of the sleeve and prevents rotational movement of the sleeve within the lock body.

According to this and other exemplary aspects of the present invention, the lock body may include an angular-latch hole intersecting with the first hole and having the latch disposed therein, and the latch is operatively connected to a latch spring in the angular-latch hole, which latch spring is configured to urge the latch into the first position.

According to this and other exemplary aspects of the present invention, the lock body may include a shackle-retaining hole intersecting with the second hole and having a shackle-retain peg disposed therein, the long-leg of the shackle may include a flat surface and a neck, the shackle-retain peg allows for rectilinear movement of the shackle along the lock body when the shackle-retain peg is in contact with the flat surface of the long-leg and rotational movement of the shackle about the long-leg when the shackle-retain peg is in contact with the neck, and the long-leg of the shackle cannot be removed from the lock body without first removing the shackle-retain peg.

According to this and other exemplary aspects of the present invention, the latch may include a tip and the short leg of the shackle may include a latch-cut out for receipt of the tip of the latch when the latch is in the first position, the rotational movement of the cylinder causes the extended-pin to move the latch so as to disengage the tip of the latch from the latch-cut out of the short-leg of the shackle and allow movement of the short-leg of the shackle out of the first hole of the lock body so that the padlock is in the unlocked mode.

According to this and other exemplary aspects of the present invention, the padlock may also include a shackle spring disposed within the second hole of the lock body and operatively coupled to the long leg of the shackle so as to urge the shackle away from the lock body, when the latch is in the second position the shackle spring causes movement of the short-leg the shackle out of the first hole of the lock body.

According to this and other exemplary aspects of the present invention, a padlock may include a shackle having a short leg and a long leg, a lock body having a first hole configured to receive the short leg of the shackle, and a second hole configured to receive the long leg of the shackle, the long leg is configured to at least partially remain within the lock body, a latch movable between a first position engaged with the short leg of the shackle and a second position disengaged from the short leg of the shackle, a cylinder configured for rotational movement within the lock body and operatively engaged with the latch, a sleeve configured to control rotational movement of the cylinder, when the latch is in the first position the padlock is in a locked mode, when the latch is in the second position the padlock is in an unlocked mode, the cylinder may also include one or more wafers, and one or more wafer springs, each wafer spring engages with a corresponding wafer of the one or more wafers to urge the corresponding wafer in a direction to extend out of the cylinder, the sleeve may include a wafer slot configured to receive the one or more wafers when the one or more wafers are extended out of the cylinder, the wafer slot is configured to inhibit rotation of the cylinder when the one or more wafers are extended out of the cylinder, the cylinder may also include a rotational-control finger extending from the cylinder, the sleeve further comprises a control-edge lock side and a control-edge open side, the control-edge lock side is contacted by the rotational-control finger of the cylinder during the locked mode such that the one or more wafers will align with the wafer slot of the sleeve to allow the one or more wafers extend out of the cylinder, and the control-edge open side is contacted by the rotational-control finger of the cylinder during the unlocked mode such that the cylinder will rotate between the control-edge lock side and the control-edge open side of the sleeve, when all of the one or more wafers are retracted into the cylinder, the cylinder is configured to rotate within the sleeve, the lock body may also include a cylinder-hole formed therein configured for receipt of the sleeve and the cylinder, the cylinder is at least partially surrounded by the sleeve, the cylinder-hole may include a sleeve-wing slot configured for receipt of a wing of the sleeve, engagement of the sleeve-wing slot with the wing of the sleeve prevents rotation of the sleeve within the lock body, the sleeve may also include a retain-slot, the lock body further comprises a cylinder-retaining hole formed therein configured for receipt of a cylinder-retain peg, the cylinder-retain peg is positioned within the retain-slot of the sleeve and prevents rotational movement of the sleeve within the lock body, the cylinder may also include a retain-slot, the cylinder-retain peg is positioned within the retain-slot of the cylinder to allow the cylinder to have rotational movement within the lock body but prevent rectilinear movement of the cylinder within the lock body, the cylinder may also include a bigger radius edge formed at one end of the cylinder, which bigger radius edge has a circumferential dimension larger than a circumferential dimension of the sleeve in order to retain the sleeve within the lock body, the latch may include a control-slot, the cylinder may include an extended-pin configured for operative engagement with the control-slot of the latch, and by the rotational movement of the cylinder the extended-pin is configured to move the latch between the first position and the second position so as to operate the padlock between the locked mode and the unlocked mode.

The exemplary aspects of the present invention discussed are merely exemplary, and it is understood the present invention is not limited to any particular aspects or combinations thereof. Rather, the present invention encompasses both individual elements of the exemplary aspects alone, and in combination with any other individual elements whether or not specifically recited as an exemplary aspect.

The reference numbers and corresponding elements are summarized below:

10 padlock
20 lock body
21 short-leg shackle hole
22 long-leg shackle hole
23 angular-latch hole
24 cylinder-retaining hole
25 shackle-retaining hole
26 straight-latch hole
27 cylinder hole
28 sleeve-wing slot
30 shackle
31 latch-cut out
32 neck
33 flat-surface
34 long-leg
35 short-leg
40 latch
41 tip
42 control-slot
43 tail
50 cylinder
51 extended-pin
52 retain-slot
53 rotational-control finger
54 wafer-slot
55 bigger radius edge
60 sleeve
61 wafer-slot
62*a* control-edge lock side
62*b* control-edge open side
63 wing
64 retain-slot
65 cylinder-hole
70 wafers
80 cylinder-retain peg
90 shackle-retain peg
100 latch-hole sealing plug
110 latch spring
120 shackle spring
130 wafer spring
140 key

BRIEF DESCRIPTION OF THE DRAWINGS

For a fuller understanding of the nature and object of the present invention, reference should be had to the following detailed description taken in connection with the accompanying drawings, in which.

DETAILED DESCRIPTION

Figure 1A:
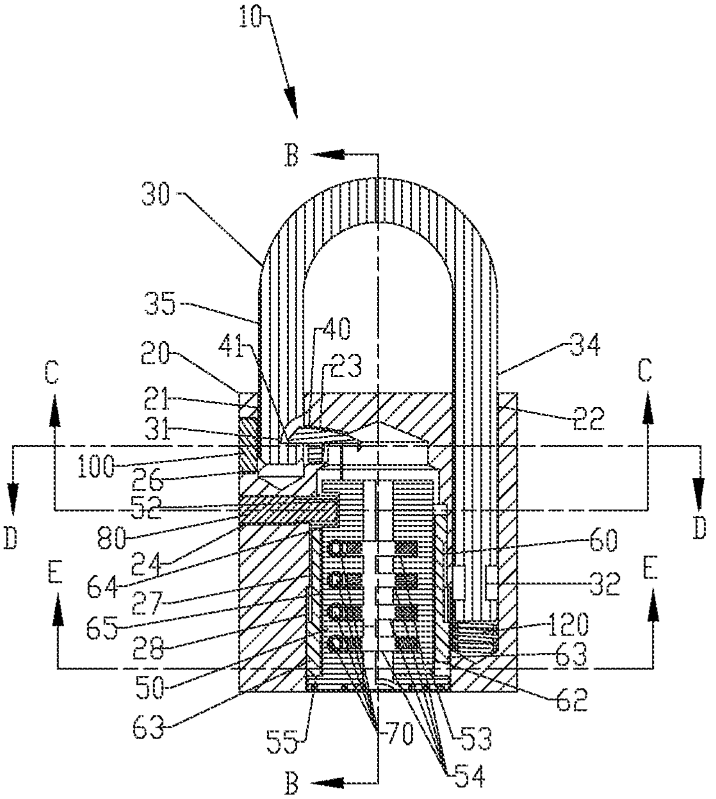
FIG. 1A is a cross-sectional view of an exemplary padlock according to an aspect of the invention in a locked mode taken along line A-A from FIG. 1B.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Figure 1B:
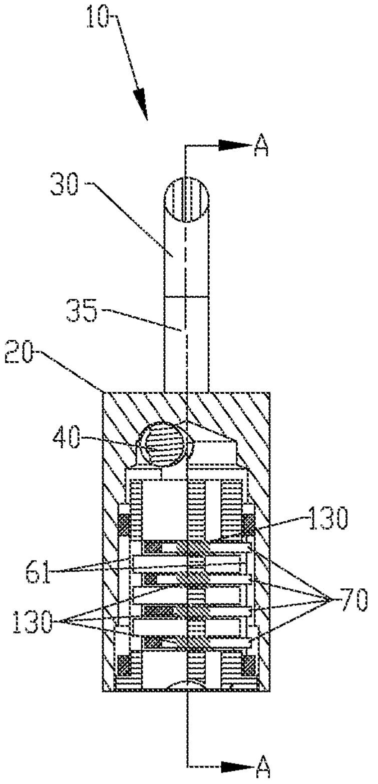
FIG. 1B is a cross-sectional view of the exemplary padlock taken along line B-B from FIG. 1A.
Figure 1C:
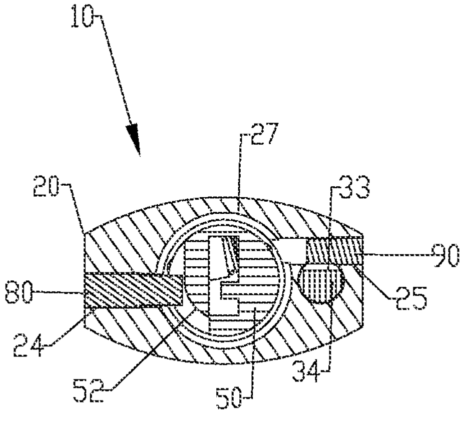
FIG. 1C is a cross-sectional view of the exemplary padlock taken along line C-C from FIG. 1A.
Figure 1D:
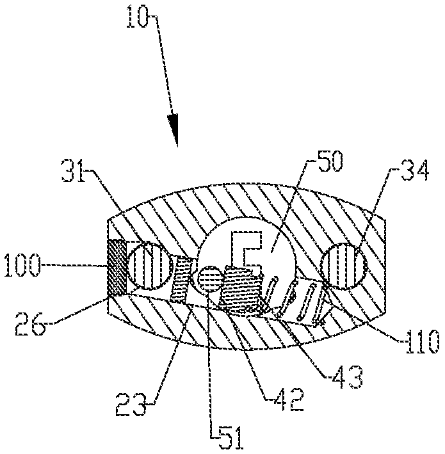
FIG. 1D is a cross-sectional view of the exemplary padlock taken along line D-D from FIG. 1A.
Figure 1E:
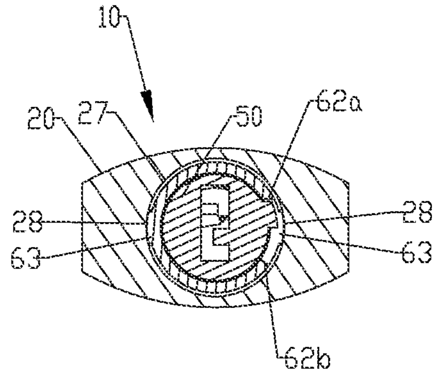
FIG. 1E is a cross-sectional view of the exemplary padlock taken along line E-E from FIG. 1A.
Figure 1F:
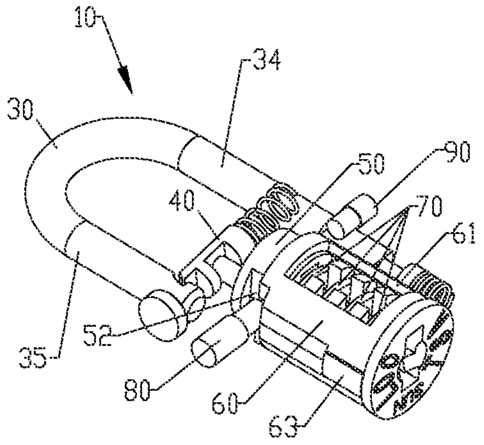
FIG. 1F is a perspective view of the exemplary padlock with the lock body removed so as to illustrate exemplary internal components of the padlock.
Figure 1G:
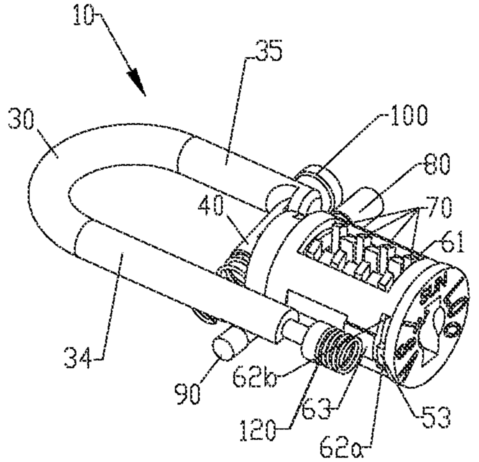
FIG. 1G is a perspective view of the exemplary padlock with the lock body removed so as to illustrate exemplary internal components of the padlock.
Figure 2:
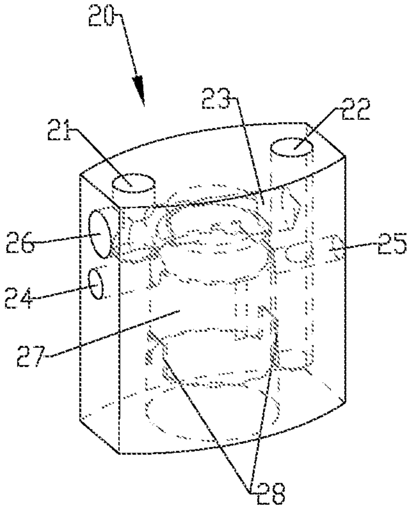
FIG. 2 is a perspective view of an exemplary lock body that may be used with the exemplary padlock according to an aspect of the present invention.
Figure 7A:
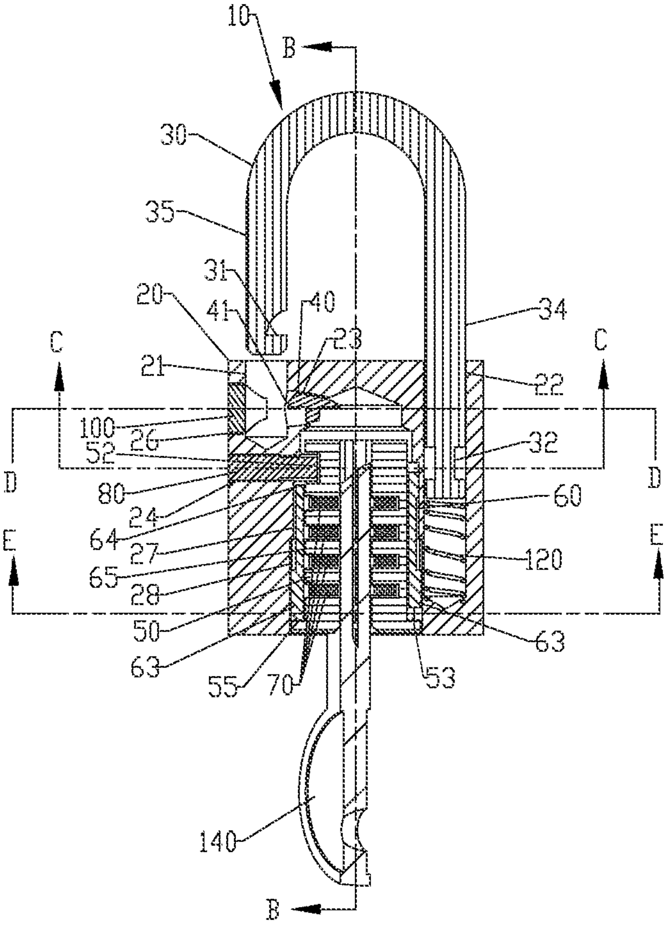
FIG. 7A is a cross-sectional view of the exemplary padlock according to an aspect of the invention in an unlocked mode taken along line A-A from FIG. 7B.
Figure 7B:
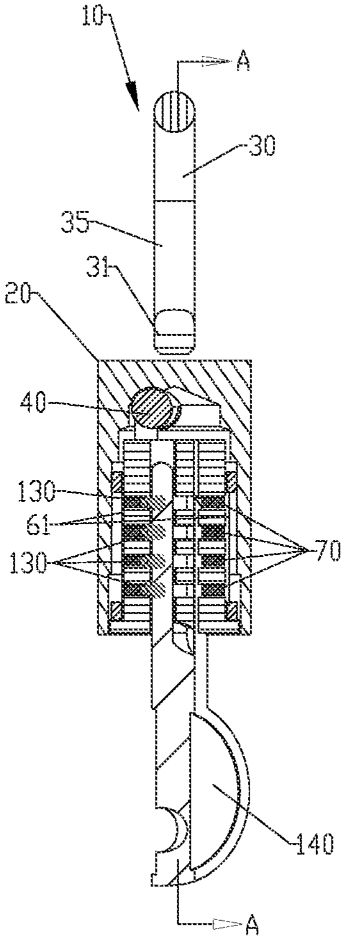
FIG. 7B is a cross-sectional view of the exemplary padlock taken along line B-B from FIG. 7A.
Figure 7C:
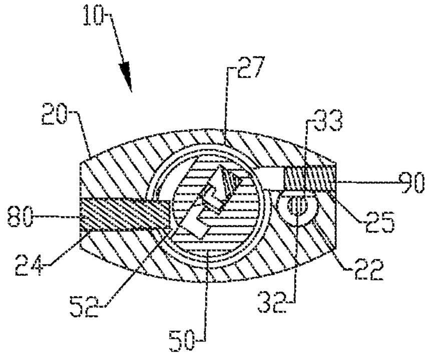
FIG. 7C is a cross-sectional view of the exemplary padlock taken along line C-C from FIG. 7A.
Figure 7D:
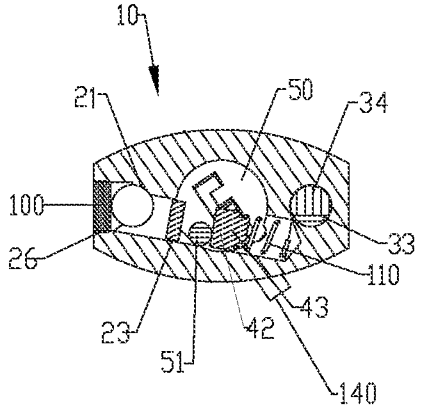
FIG. 7D is a cross-sectional view of the exemplary padlock taken along line D-D from FIG. 7A.
Figure 7E:
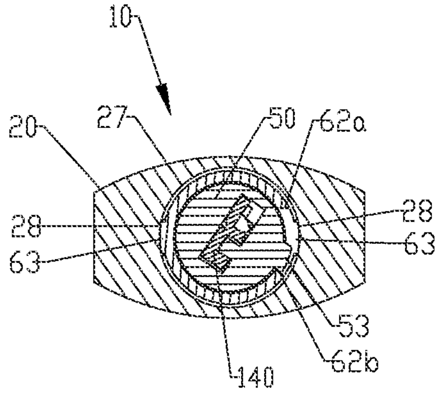
FIG. 7E is a cross-sectional view of the exemplary padlock taken along line E-E from FIG. 7A.
Figure 7F:
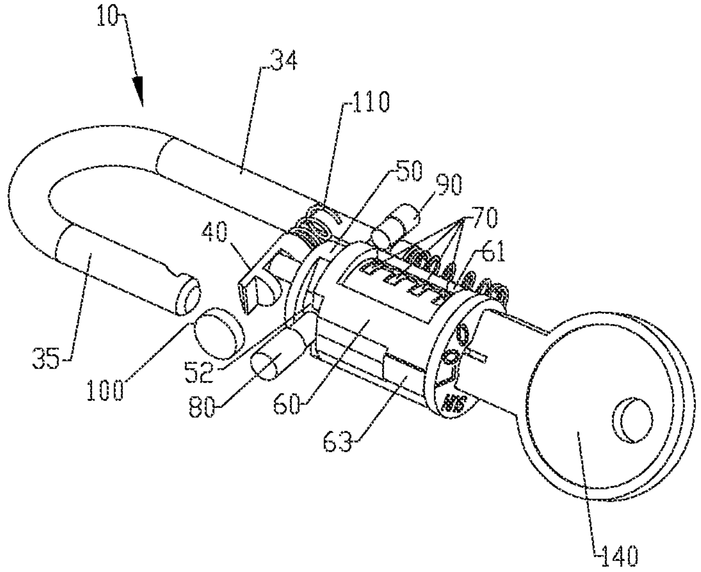
FIG. 7F is a perspective view of the exemplary padlock with the lock body removed so as to illustrate exemplary internal components of the padlock.
Figure 7G:
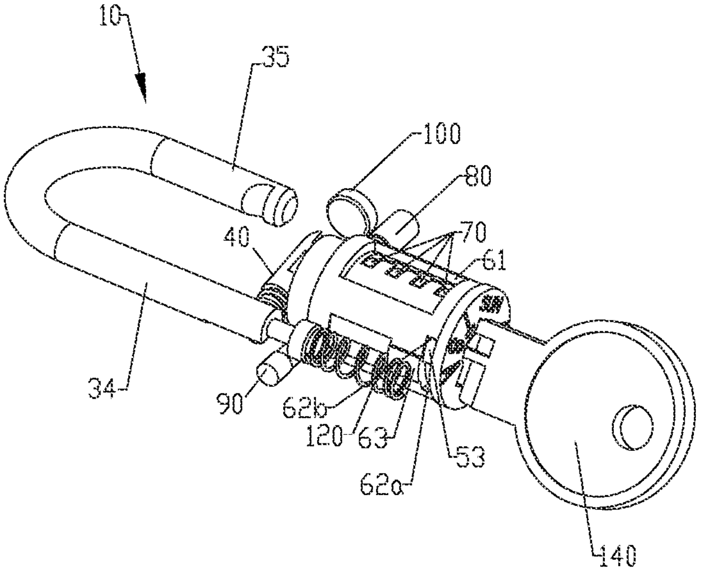
FIG. 7G is a perspective view of the exemplary padlock with the lock body removed so as to illustrate exemplary internal components of the padlock.

Referring to FIGS. 1A, 1F, 1G, 2, 7A, 7F and 7G, therein illustrated is an exemplary embodiment of a padlock, for example a keyed padlock, generally indicated by reference numeral 10 according to an aspect of the present invention. The padlock 10 may include a lock body 20 forming a housing for the padlock 10. The lock body 20 may include a short-leg shackle hole 21 and a long-leg shackle hole 22 formed therein. The lock body 20 of the padlock 10 may further include an angular-latch hole 23, which angular-latch hole 23 may be formed so as to at least partially intersect either or both the short-leg shackle hole 21 and/or the long-leg shackle hole 22. The lock body 20 may also include a cylinder-retaining hole 24 and a cylinder-hole 27 formed therein, wherein the cylinder-retaining hole 24 and the cylinder-hole 27 may be formed within the lock body 20 so as to intersect each other. The lock body 20 of the padlock 10 may also include a shackle-retaining hole 25 formed within the lock body 20 so as to intersect the long-leg shackle hole 22. The lock body 20 may further include a straight-latch hole 26 positioned on the periphery of the lock body 20 and at least partially intersecting the angular-latch hole 23. The lock body 20 may also include one or more sleeve-wing slots 28 formed in the cylinder-hole 27.

Figure 3:
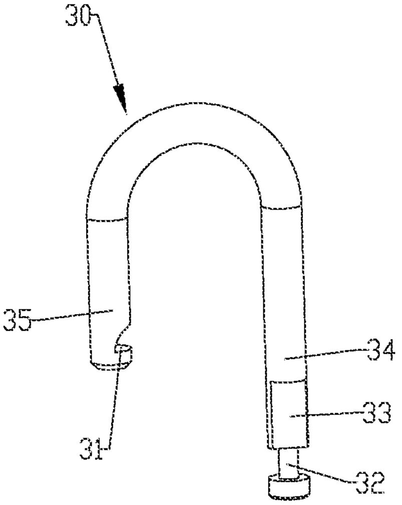
FIG. 3 is a perspective view of an exemplary shackle that may be used with the exemplary padlock according to an aspect of the present invention.

Referring now to FIGS. 1A, 1F, 1G, 3, 7A, 7F and 7G, the padlock 10 may further include a shackle 30 having a long-leg 34 and a short-leg 35. The long-leg 34 of the shackle 30 may include a neck 32 having a smaller diameter than the diameter of the long-leg 34. The long-leg 34 may also include a flat-surface 33 formed on a portion of the long-leg 34, which flat-surface 33 may be formed adjacent to the neck 32. The short-leg 35 of the shackle 30 may include a latch-cut out 31 formed therein. The long-leg 34 of the shackle 30 may be configured and dimensioned so as to be received in the long-leg shackle hole 22 of the lock body 20 of the padlock 10, and the short-leg 35 of the shackle 30 may be configured and dimensioned so as to be received in short-leg shackle hole 21 of the lock body 20.

Figure 4:
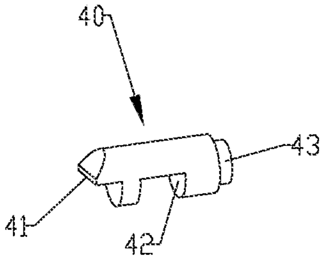
FIG. 4 is a perspective view of an exemplary latch that may be used with the exemplary padlock according to an aspect of the present invention.

Referring now to FIGS. 1A, 1B, 1D, 1F, 1G, 4, 7A, 7B, 7D, 7F and 7G, the padlock 10 may also include a latch 40 configured for operative engagement with the latch-cut out 31 of the short-leg 35 of the shackle 30. The latch 40 may include a tip 41, a control-slot 42 and a tail 43.

Figure 5:
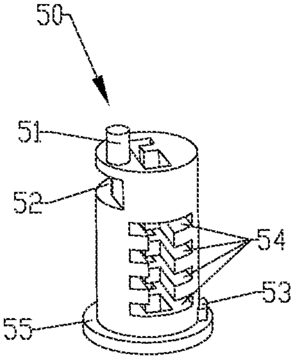
FIG. 5 is a perspective view of an exemplary cylinder that may be used with the exemplary padlock according to an aspect of the present invention.

Referring now to FIGS. 1A, 1F, 1G, 5, 7A, 7F and 7G, the padlock 10 may further include a cylinder 50 configured and dimensioned to be received within the cylinder-hole 27 of the lock body 20. The cylinder 50 may include an extended-pin 51 protruding from one end of the cylinder 50, and a retain-slot 52 formed in the perimeter of the cylinder 50. The cylinder 50 may also include a rotational-control finger 53 and one or more wafer-slots 54 formed therein. The cylinder 50 may further have a bigger radius edge 55 extending from the cylinder 50 on an end of the cylinder 50 opposite the extended-pin 51 end. The bigger radius edge 55 has a circumference larger than the circumference of the cylinder 50. The bigger radius edge 55 of the cylinder 50 will prevent the sleeve 60 from falling off from the cylinder 50 once the padlock 10 has been assembled. The bigger radius edge 55 is also configured to inhibit an intruder from using a thin layer of metal, e.g. shim or knife, to contact the wafer 70, thus preventing a lock-picking attack.

Figure 6A:
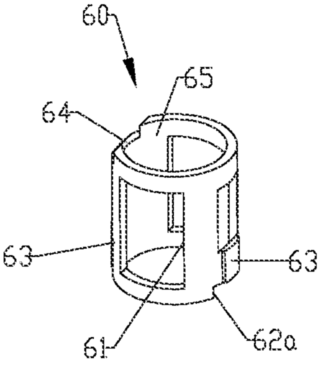
FIG. 6A is a perspective view of an exemplary sleeve that may be used with the exemplary padlock according to an aspect of the present invention.
Figure 6B:
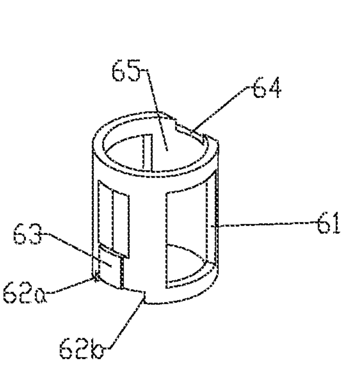
FIG. 6B is a perspective view of the exemplary sleeve.

Referring now to FIGS. 1A, 1F, 1G, 6A, 6B, 7A, 7F and 7G, the padlock 10 may also include a sleeve 60 configured and dimensioned to be received within the cylinder-hole 27. The sleeve 60 may include one or more wafer-slots 61. The sleeve 60 may also include a cutout on one end that has a control-edge lock side 62A and a control-edge open side 62B. The sleeve 60 may further include a wing 63 that is configured and dimensioned to be received within the sleeve-wing slot 28 of the cylinder-hole 27. The wing 63 is assembled into the sleeve-wing slot 28 of the cylinder-hole 27 to prevent rotation of the sleeve 60 within the cylinder-hole 27. The end of the sleeve 60 opposite the cutout may include a retain-slot 64, and the sleeve 60 may be configured and dimensioned to receive the cylinder 50 within a cylinder-hole 65 of the sleeve 60.

Referring now to FIGS. 1A, 1B, 1F, 1G, 7A, 7B, 7F and 7G, the padlock 10 may be configured to be operated by a key and include one or more wafers 70 within the wafer-slots 54 of the cylinder 50. Each of the wafers 70 may be engaged with a wafer spring 130 configured to urge the wafers 70 towards one of the wafer-slots 61 in the sleeve 60. In this manner, when a correct cut key 140 has not been inserted into the cylinder 50 to move the wafers 70 out of the wafer-slots 61 of the sleeve 60, the cylinder 50 cannot be rotated within the padlock 10. The padlock 10 may also include a cylinder-retain peg 80 positioned within the cylinder-retaining hole 24 of the lock body 20, and configured to engage with the retain-slot 52 of the cylinder 50. The cylinder-retain peg 80 may also be configured to engage with the retain-slot 64 of the sleeve 60. The retain-slot 64 of the sleeve 60 has a shape configured to receive the cylinder-retaining peg 80 so that the cylinder-retaining peg 80 prevents rotation of the sleeve 60 within the cylinder-hole 27 of the lock body 20. The retain-slot 64 of the sleeve 60 has a shape which will receive the cylinder-retain peg 80 such that it prevents the sleeve 60 from rotating. Accordingly, advantageously both the wing 63 and the retain-slot 64 restrict the sleeve 60 from rotating which further restricts the cylinder 50 from rotating when the padlock 10 is in the locked mode when the wafer 70 is extended outward in contact with the wafer-slot 61 of the sleeve 60. The cylinder-retain peg 80 may be installed in the padlock 10 by insertion of the cylinder-retain peg 80 into the cylinder-retaining hole 24 of the lock body 20 in order to engage with the retain-slot 52 of the cylinder 50 and the retain-slot of the sleeve 60. The cylinder-retain peg 80 may also be assembled into the retain-slot 52 of the cylinder 50. The retain-slot 52 is designed to allow the cylinder 50 to rotate a certain amount of degrees between a locked mode and an unlocked mode of the padlock 10. Additionally, the cylinder-retain peg 80 may be further configured to facilitate retention of the cylinder 50 within the cylinder-hole 27 once the cylinder-retain peg 80 has been installed into the retain-slot 52 of the cylinder 50. Once the cylinder-retain peg 80 is assembled into the retain-slot 52 of the cylinder 50 and the retain-slot 64 of the sleeve 60, the sleeve 60 will not be able to rotate, and the cylinder 50 will have no vertical movement but will have rotational movement if the correct cut key 140 is inserted into the padlock 10. Thus, the cylinder-retaining peg 80 is configured to prevent rotation of the sleeve 60 within the lock body 20, limit the rotational movement of the cylinder 50, and retain the cylinder 50 within the lock body 20.

Still referring to FIGS. 1A, 1B, 1F, 1G, 7A, 7B, 7F and 7G, the padlock 10 may further include a shackle-retain peg 90 positioned within the shackle-retaining hole 25 of the lock body 20, and configured to engage with the neck 32 and flat-surface 33 of the long-leg 34 of the shackle 30. The padlock 10 may also include a latch-hole sealing plug 100 positioned at the end opening of the straight-latch hole 26. The padlock 10 may also include a latch spring 110 positioned within the angular-latch hole 23, and configured to urge the latch 40 in a direction towards the short-leg 35 of the shackle 30 so that the tip 41 of the latch 40 may be engaged with the latch-cut out 31 when the padlock 10 is in a locked mode. The padlock 10 may further include a shackle spring 120 positioned within the long-leg shackle hole 22 and configured to urge the long-leg 34 of the shackle 30 in a direction away from the lock body 20. The padlock 10 may be operated between a locked mode, e.g., FIGS. 1A and 1B, and an unlocked mode, e.g., FIGS. 7A and 7B, by the correct cut key 140.

The locked mode of the padlock 10 will now be discussed with reference to FIGS. 1A-1G, 2-5 and 6A and 6B. Each wafer-slot 54 of the cylinder 50 is configured to receive a wafer spring 130 and a wafer 70. In the exemplary embodiment of the padlock 10 illustrated, four wafer-slots 54 are formed in the cylinder 50, and one wafer spring 130 and one wafer 70 is placed in each wafer-slot 54 for a total of four wafer springs 130 and four wafers 70. However, it is understood the present invention is not limited to any particular number of wafer springs 130 and/or wafers 70, and any number, including one of each, of wafer springs 130 and/or wafers 70 may be used. Each of the wafer springs 130 exerts force on the corresponding wafer 70 to urge the wafer 70 to extend past the diameter of the cylinder 50 so the wafers 70 are configured to extend beyond the cylindrical periphery of the cylinder 50. The cylinder 50 is disposed into the cylinder-hole 65 of the sleeve 60, and as a result of the wafer springs 130 urging the wafers 70 away from the cylinder 50, one or more of the wafers 70 when extended may extend into and be in contact with the wafer-slot 61 of the sleeve 60 in the locked mode of the padlock 10. Without the correct cut key 140, the user cannot open the padlock 10 as one or more of the wafers 70 are extended out and in contact with the wafer-slot 61, thereby inhibiting rotational movement of the cylinder 50.

Still referring to FIGS. 1A-1G, 2-5 and 6A and 6B, in order to facilitate proper alignment of the cylinder 50 within the sleeve 60, the cylinder 50 includes the rotational-control finger 53 which is disposed between the control-edge lock side 62A and control-edge open side 62B. The engagement of the rotational-control finger 53 between the control-edge lock side 62A and the control-edge open side 62B allows the cylinder 50 to rotate in an open direction when the wafers 70 are withdrawn into the cylinder 50 by the correct cut key 140 and the wafers 70 are no longer engaged with the wafer-slot 61, but inhibits rotation of the cylinder 50 past the control-edge lock side 62A and the control-edge open side 62B so as to maintain proper alignment of the wafers 70 with the wafer-slot 61. The control-edge lock side 62A is contacted by the rotational-control finger 53 of the cylinder 50 during the locked mode such that the cylinder 50 will not further rotate in the locked mode such that the wafer 70 will align with the wafer-slot 61 to let the wafer 70 extend out of the cylinder 50 to place it in locked mode when the correct cut 140 has been withdrawn from the cylinder 50.

Still referring to FIGS. 1A-1G, 2-5 and 6A and 6B, in the locked mode of the padlock 10 the tip 41 of the latch 40 is engaged with the latch-cut out 31 of the short-leg 35 of the shackle 30. The latch spring 110 is configured to always push the tip 41 in the direction of the latch-cut out 31 of the shackle 30. Due to the engagement of the at least substantially flat surfaces of the tip 41 and latch-cut out 31, the shackle 30 resists the urging of the shackle spring 120, which is compressed by the long-leg 34 of the shackle 30. In this manner, the latch 40 is positioned so as to prevent removal of the short-leg 35 of the shackle 30 from the short-leg shackle hole 21 of the lock body 20, and the padlock 10 remains in the locked mode. The latch 40 is positioned on top of the cylinder 50, and the extended-pin 51 of the cylinder 50 extends into the control-slot 42 of the latch 40. The latch 40 is positioned in the angular-latch hole 23, and the latch-hole sealing plug 100 which is assembled to the straight-latch hole 26 of the lock body 20 to seal the angular-latch hole 23 from exposure.

Still referring to FIGS. 1A-1G, 2-5 and 6A and 6B, the long-leg 34 of the shackle 30 may include the flat-surface 33 to allow the long-leg 34 of the shackle 30 to move along the shackle-retain peg 90 when the padlock is in the unlocked mode. The shackle-retain peg 90 is placed in between the flat-surface 33 and the shackle-retaining hole 25 of the lock body 20 in the locked mode. The neck 32 of the long-leg 34 of the shackle 30 is configured to catch the shackle-retain peg 90 in the unlocked mode to keep the long-leg 34 of the shackle 30 in the long-leg shackle hole 22 of the lock body 20.

Referring now to FIGS. 7A-7G, the unlocked mode of the padlock 10 will now be discussed. When the correct cut key 140 is inserted in the cylinder 50, the wafers 70 will be withdrawn inside of the cylinder 50 away from the wafer-slot 61 of the sleeve 60 so that no wafer 70 extends out of the wafer-slots 54 and contacts the wafer-slot 61 of the sleeve 60. The wafers 70 will no longer extend into the wafer-slot 61, and the cylinder 50 will be free to rotate within the cylinder-hole 65 of the sleeve 60. The cylinder 50 can now be turned from the rotational-control finger 53 being in contact with control-edge lock side 62A to the control-edge open side 62B of the sleeve 60. As the cylinder 50 rotates to move the rotational-control finger 53 into contact with the control-edge open side 62B the extended-pin 51 will also move along the circular arc of the cylinder 50 to contact the control-slot 42 of the latch 40. As the extended-pin 51 moves along the circular arc of the cylinder 50 caused by rotation of the cylinder, the extended-pin 51 will act upon the control-slot 42 of the latch 40 to compress the latch spring 110, and cause movement of the tip 41 of the latch 40 away from the short-leg 35 of the shackle 30. This movement of the tip 41 will cause disengagement of the latch 40 from the latch-cutout 31 of the shackle 30. As the tip 41 of the latch 40 is disengaged from the latch-cutout 31 of the shackle 30, the shackle spring 120 will exert a force on the long-leg 34 of the shackle 30 to push the shackle 30 away from the lock body 20 until the shackle-retain peg 90 contacts the neck 32 of the shackle 30 which causes retention of a portion of the long-leg 34 of the shackle 30 inside the long-leg shackle hole 22 of the lock body 20.

Still referring to FIGS. 7A-7G, in the unlocked mode, the wing 63 of the sleeve 60 is still assembled in the sleeve-wing slot 28 of the lock body 20. Such an arrangement inhibits rotational movement of the sleeve 60 during transition of the padlock 10 from the locked mode to the unlocked mode. The retain-slot 64 of the sleeve 60 is further assembled with the cylinder retain-slot 52 and is assembled to the cylinder-retain peg 80 together such that the cylinder 50 rotates in the unlocked mode but the sleeve 60 will have no rotational movement. The sleeve 60 still remains positioned between the cylinder-retain peg 80 and the bigger radius edge 55 of the cylinder 50 throughout movement between and during any locked mode and unlocked mode.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. A padlock comprising:

a shackle having a short leg and a long leg;

a lock body having a first hole configured to receive the short leg of the shackle, a second hole configured to receive the long leg of the shackle, and a cylinder retaining hole formed therein, wherein the long leg is configured to at least partially remain within the lock body and the cylinder retaining hole is configured for receipt of a cylinder retain peg;

a latch movable between a first position engaged with the short leg of the shackle and a second position disengaged from the short leg of the shackle, wherein the latch comprises a control-slot;

a cylinder configured for rotational movement within the lock body and operatively engaged with the latch, wherein the cylinder comprises an extended-pin configured for operative engagement with the control-slot of the latch and a cylinder retain slot; and a sleeve configured to control rotational movement of the cylinder and comprising a sleeve retain slot;

wherein when the latch is in the first position the padlock is in a locked mode, and when the latch is in the second position the padlock is in an unlocked mode;

wherein by the rotational movement of the cylinder the extended-pin is configured to move the latch between the first position and the second position so as to operate the padlock between the locked mode and the unlocked mode;

wherein the cylinder retain peg is positioned within the cylinder retain slot of the cylinder to allow the cylinder to have rotational movement within the lock body but prevent rectilinear movement of the cylinder within the lock body; and wherein the cylinder peg is positioned within the sleeve retain slot of the sleeve and prevents rotational movement of the sleeve within the lock body.

2. The padlock according to claim 1, wherein the cylinder comprises one or more wafers, and one or more wafer springs, wherein each wafer spring engages with a corresponding wafer of the one or more wafers to urge the corresponding wafer in a direction to extend out of the cylinder; and wherein the sleeve comprises a wafer slot configured to receive the one or more wafers when the one or more wafers are extended out of the cylinder, and wherein the wafer slot is configured to inhibit rotation of the cylinder when the one or more wafers are extended out of the cylinder.

3. The padlock according to claim 2, wherein the cylinder further comprises a rotational-control finger extending from the cylinder;

wherein the sleeve further comprises a control-edge lock side and a control-edge open side; and wherein the control-edge lock side is contacted by the rotational-control finger of the cylinder during the locked mode such that the one or more wafers will align with the wafer slot of the sleeve to allow the one or more wafers to extend out of the cylinder, and the control-edge open side is contacted by the rotational-control finger of the cylinder during the unlocked mode such that the cylinder will rotate between the control-edge lock side and the control-edge open side of the sleeve.

4. The padlock according to claim 2, wherein the cylinder is configured for receipt of a correct cut key, wherein the correct cut key causes all of the one or more wafers to retract into the cylinder so that none of the one or more wafers are extended into the wafer-slot of the sleeve; and wherein when all of the one or more wafers are retracted into the cylinder, the cylinder is configured to rotate within the sleeve.

5. The padlock according to claim 4, wherein by the rotational movement of the cylinder the extended-pin is configured to move the latch from the first position to the second position so as to operate the padlock from the locked mode to the unlocked mode when all of the one or more wafers are retracted into the cylinder by the correct cut key.

6. The padlock according to claim 1, wherein the lock body further comprises a cylinder-hole formed therein configured for receipt of the sleeve and the cylinder, wherein the cylinder is at least partially surrounded by the sleeve; and wherein the cylinder-hole comprises a sleeve-wing slot configured for receipt of a wing of the sleeve, wherein engagement of the sleeve-wing slot with the wing of the sleeve prevents rotation of the sleeve within the lock body.

7. The padlock according to claim 1, wherein the cylinder further comprises a bigger radius edge formed at one end of the cylinder, which bigger radius edge has a circumferential dimension larger than a circumferential dimension of the sleeve in order to retain the sleeve within the lock body.

8. The padlock according to claim 1, wherein the lock body further comprises an angular-latch hole intersecting with the first hole and having the latch disposed therein; and wherein the latch is operatively connected to a latch spring in the angular-latch hole, which latch spring is configured to urge the latch into the first position.

9. The padlock according to claim 1, wherein the lock body further comprises a shackle-retaining hole intersecting with the second hole and having a shackle-retain peg disposed therein;

wherein the long-leg of the shackle comprises a flat surface and a neck, wherein the shackle-retain peg allows for rectilinear movement of the shackle along the lock body when the shackle-retain peg is in contact with the flat surface of the long-leg and rotational movement of the shackle about the long-leg when the shackle-retain peg is in contact with the neck; and wherein the long-leg of the shackle cannot be removed from the lock body without first removing the shackle-retain peg.

10. The padlock according to claim 1, wherein the latch further comprises a tip and the short leg of the shackle comprises a latch-cut out for receipt of the tip of the latch when the latch is in the first position;

wherein the rotational movement of the cylinder causes the extended-pin to move the latch so as to disengage the tip of the latch from the latch-cut out of the short-leg of the shackle and allow movement of the short-leg of the shackle out of the first hole of the lock body so that the padlock is in the unlocked mode.

11. The padlock according to claim 1, further comprising a shackle spring disposed within the second hole of the lock body and operatively coupled to the long leg of the shackle so as to urge the shackle away from the lock body;

wherein when the latch is in the second position the shackle spring causes movement of the short-leg the shackle out of the first hole of the lock body.

12. A padlock comprising:

a shackle having a short leg and a long leg;

a lock body having a first hole configured to receive the short leg of the shackle, and a second hole configured to receive the long leg of the shackle, wherein the long leg is configured to at least partially remain within the lock body;

a latch movable between a first position engaged with the short leg of the shackle and a second position disengaged from the short leg of the shackle;

a cylinder configured for rotational movement within the lock body and operatively engaged with the latch; and a sleeve configured to control rotational movement of the cylinder;

wherein when the latch is in the first position the padlock is in a locked mode, and when the latch is in the second position the padlock is in an unlocked mode;

wherein the cylinder comprises one or more wafers, and one or more wafer springs, wherein each wafer spring engages with a corresponding wafer of the one or more wafers to urge the corresponding wafer in a direction to extend out of the cylinder;

wherein the sleeve comprises a wafer slot configured to receive the one or more wafers when the one or more wafers are extended out of the cylinder, and wherein the wafer slot is configured to inhibit rotation of the cylinder when the one or more wafers are extended out of the cylinder;

wherein the cylinder further comprises a rotational-control finger extending from the cylinder, and the sleeve further comprises a control-edge lock side and a control-edge open side;

wherein the control-edge lock side is contacted by the rotational-control finger of the cylinder during the locked mode such that the one or more wafers will align with the wafer slot of the sleeve to allow the one or more wafers extend out of the cylinder, and the control-edge open side is contacted by the rotational-control finger of the cylinder during the unlocked mode such that the cylinder will rotate between the control-edge lock side and the control-edge open side of the sleeve;

wherein when all of the one or more wafers are retracted into the cylinder, the cylinder is configured to rotate within the sleeve;

wherein the lock body further comprises a cylinder-hole formed therein configured for receipt of the sleeve and the cylinder, wherein the cylinder is at least partially surrounded by the sleeve;

wherein the cylinder-hole comprises a sleeve-wing slot configured for receipt of a wing of the sleeve, wherein engagement of the sleeve-wing slot with the wing of the sleeve prevents rotation of the sleeve within the lock body;

wherein the sleeve further comprises a retain-slot;

wherein the lock body further comprises a cylinder-retaining hole formed therein, wherein the cylinder-retaining hole is configured for receipt of a cylinder-retain peg;

wherein the cylinder-retain peg is positioned within the retain-slot of the sleeve and prevents rotational movement of the sleeve within the lock body;

wherein the cylinder further comprises a retain-slot;

wherein the cylinder-retain peg is positioned within the retain-slot of the cylinder to allow the cylinder to have rotational movement within the lock body but prevent rectilinear movement of the cylinder within the lock body;

wherein the cylinder further comprises a bigger radius edge formed at one end of the cylinder, which bigger radius edge has a circumferential dimension larger than a circumferential dimension of the sleeve in order to retain the sleeve within the lock body;

wherein the latch comprises a control-slot;

wherein the cylinder comprises an extended-pin configured for operative engagement with the control-slot of the latch; and wherein by the rotational movement of the cylinder the extended-pin is configured to move the latch between the first position and the second position so as to operate the padlock between the locked mode and the unlocked mode.

* * * * *